United States Patent
Reuter

[15] 3,649,854
[45] Mar. 14, 1972

[54] REGULATING ARRANGEMENT PREFERABLY FOR REGULATING THE TEMPERATURE IN HEATING SYSTEMS

[72] Inventor: Fritz Reuter, Esslingen/Neckar, Germany

[73] Assignee: J. Eberspacher, Esslingen/Neckar, Germany

[22] Filed: July 3, 1969

[21] Appl. No.: 838,736

[30] Foreign Application Priority Data

Oct. 4, 1968 Germany..................P 18 01 158.0

[52] U.S. Cl..................................307/310, 219/499, 328/3, 330/146
[51] Int. Cl..................................................G05d 23/24
[58] Field of Search..................307/310; 328/3; 330/146; 219/499, 501

[56] References Cited

UNITED STATES PATENTS

| | | |
|---|---|---|
| 1,927,846 | 9/1933 | Rath........................330/146 |
| 3,149,224 | 9/1964 | Horne et al...............219/501 UX |
| 3,281,653 | 10/1966 | Burley.......................307/310 X |
| 3,504,196 | 3/1970 | Thompson.................219/499 X |

*Primary Examiner*—Roy Lake
*Assistant Examiner*—James B. Mullins
*Attorney*—McGlew and Toren

[57] ABSTRACT

A regulating arrangement comprises a control signal input bridge having a transistor amplifier connected as a diagonal and an electronic switching device connected in series in the bridge output. Means are operable to vary rhythmically the value of one arm of the bridge, and the resulting bridge diagonal voltage is applied, as a control voltage, to an active element of the bridge controlling the bridge output. One arm of the bridge includes a negative temperature coefficient resistance and the other arm of the bridge includes a resistance whose value is varied rhythmically either by operation of a circuit interrupter or by an electric pulse transmitter.

21 Claims, 4 Drawing Figures

REGULATING ARRANGEMENT PREFERABLY FOR REGULATING THE TEMPERATURE IN HEATING SYSTEMS

BACKGROUND OF THE INVENTION

A known regulating arrangement comprises an input bridge with a transistor amplifier arranged in the bridge diagonal and with a series-connected electronic switching device. An electric resistance is varied in dependence on mechanical or thermodynamic quantities so that an electrical or electronic system, connected in series with the regulating arrangement, is influenced. Such a regulator is particularly suitable for temperature regulation, for example, in heating systems. In these heating systems, the object is to regulate the supply of fuel or electric power or both in dependence on the desired temperature.

Hitherto this has been effected by providing the regulators with voluminous feedback and compensation elements in order to avoid hysteresis, that is, differences between the response point and the drop point. However, known arrangements have the considerable disadvantage that they are not only complicated in their circuit arrangement but also they react over-critically, due to the internal temperature range of the regulator proper. The closer the response, or "cut-in" point can be held to the drop or "cutout" point, the better is the regulation effected.

SUMMARY OF THE INVENTION

This invention relates to a bridge-type regulating arrangement for controlling a function in accordance with an input signal and, more particularly, to a novel and improved input bridge type regulating arrangement in which the value of one arm of the bridge is varied rhythmically and the response or cut-in point is coincident with the drop or cutout point.

In accordance with the invention, the regulating arrangement comprises an input bridge having a transistor amplifier arranged in a bridge diagonal, and having an electronic switching device connected in series with the bridge output. Means are provided to vary the value of one bridge arm of the bridge connection rhythmically with the resulting bridge diagonal voltage being applied as a control voltage to an active element. The effect of the invention arrangement is that it is possible, for the first time in regulator design, to attain a difference between response and drop of the series-connected switching part with the accuracy of ±0 and without using feedback circuits and the like. In addition, it permits a very stable coupling of the series-connected electronic switch, for example, which switches are electrically very stable. In turn, this means a great reduction in the number of parts required for the regulating arrangement.

In accordance with the invention, it has been found expedient to connect the base of the transistor amplifier in a bridge arm which comprises a variable resistance and a temperature-dependent resistance, and to connect the emmitter of the transistor amplifier to another bridge arm including a resistance whose value is variable by an interruptor. Furthermore, the collector of the transistor amplifier is connected in the input of a series-connected electronic switching device. The rhythmic mistuning of the resistance bridge can be effected by an auxiliary voltage or, in accordance with a variation of the invention, the variation in the value of the bridge arm can be effected by an electric, separately controlled element. In this regulating arrangement of the invention, the impedances of the bridge can be resistive, reactive, or active.

It has been found to be advantageous if the electric pulses, generated at the output of the electronic switch in the rhythm of the mistuned input bridge, can be integrated, for example, by an R-C member. As an alternative, the pulses generated at the output of the electronic switch in the rhythm of the mistuned input bridge, can actuate a pulse-operated electric element, for example, a pump. This last-mentioned expedient, in particular, plays a preferred role in the use of the regulating arrangement in connection with heating systems.

An object of the invention is to provide an improved and simplified regulating arrangement including a control signal input bridge.

Another object of the invention is to provide such a regulating arrangement including a transistor amplifier connected as a diagonal of the bridge.

A further object of the invention is to provide such a regulating arrangement including an electronic switching device connected in series in the bridge output.

Another object of the invention is to provide a regulating arrangement including means operable to vary rhythmically the value of one arm of the bridge.

A further object of the invention is to provide such a regulating arrangement in which the resulting bridge diagonal voltage is applied, as a control voltage, to an active element of the bridge, controlling the bridge output.

For an understanding of the principles of the invention, reference is made of the following description of typical embodiments thereof as illustrated in the accompanying drawings.

DESCRIPTION OF THE PREFERRED EMBODIMENTS

Figure 1:
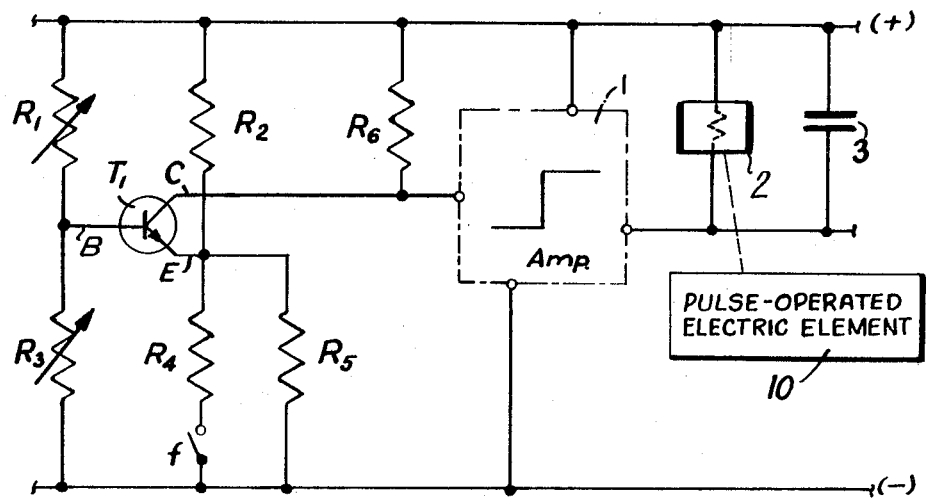
FIGS. 1 and 2 are schematic wiring diagrams of first and second embodiments of the regulating arrangement in accordance with the invention.

FIG. 1 schematically illustrates a regulating arrangement whose input is formed by a bridge connection. A first arm of the bridge is formed by an adjustable resistance $R_1$ and a negative temperature-dependent resistance $R_3$. The base B of a transistor amplifier $T_1$ is connected to the junction point of resistances $R_1$ and $R_3$. The second bridge arm is formed by a fixed resistance $R_2$ which is connected in series with a parallel combination of fixed resistances $R_4$ and $R_5$, an interruptor $f$ being connected in series with resistance $R_4$.

Resistance $R_4$ is a very low ohmic resistance as compared with resistance $R_5$. The only function of resistance $R_5$ is to act as a protective resistance in order to limit the control voltage $U_{BE}$ in case of blockage. The emitter E of the transistor amplifier $T_1$ is connected to the common junction point of resistances $R_2$, $R_4$ and $R_5$. Thus, the diagonal voltage of the bridge forms the control voltage of the bridge transistor amplifier.

Collector C of transistor amplifier $T_1$ is in series with a collector resistance $R_6$ which forms, at the same time, the input resistance for the switching and threshold value amplifier or switch 1. The switch $f$ is operable to mistune the bridge with a perfectly constant frequency. The control voltate $U_{BE}$ on the transistor amplifier $T_1$ between base B and emitter E is thus also varied. With a sufficiently high control volate $U_{BE}$ on transistor $T_1$, transistor $T_1$ becomes conductive so that a voltage drop appears across resistance $R_6$ by virtue of the collector current of the transistor amplifier. In turn this voltage either operates switch 1 or does not operate switch 1 depending on the magnitude of the voltage drop.

The output of electronic switch 1, in FIG. 1, is represented by a relay 2 having a charging condenser 3 connected in parallel therewith. The ratio of the resistance of relay 2 and charging condenser 3 is so selected that relay 2 will not drop when supplied with pulses uninterruptedly. The relay controls a pulse-actuated electric element 10 such as a pump.

Figure 2:
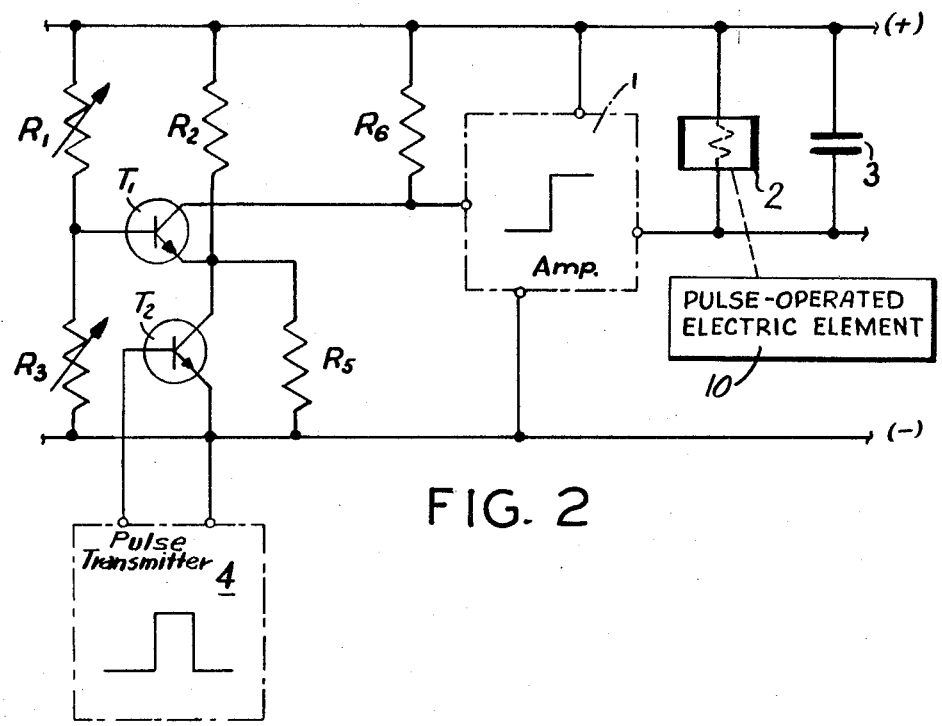

FIG. 2 schematically illustrates a regulator which has the same construction as that of FIG. 1. In FIG. 2 resistance $R_4$ is replaced by a switching transistor $T_2$ which is controlled by a mechanical or electrical pulse transmitter 4.

Figure 3:
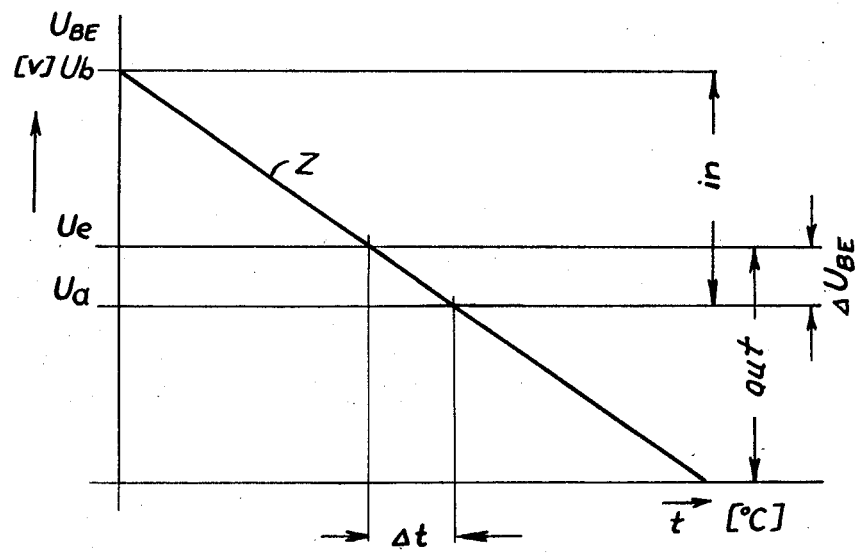
FIG. 3 is a diagram graphically illustrating the operation of a known regulator which does not have any mistuning device for the input bridge.

FIG. 3 graphically demonstrates how a normal regulator, having no bridge mistuning device, works. The control voltage $U_{BE}$ for the transistor amplifier is plotted as a function of a negative temperature-dependent resistance. It can be seen from FIG. 3 that, for the threshold value of the switch, there is a difference between the input voltage $U_e$ and the output voltage $U_a$. This is generally called the hysteresis and is equal to $\Delta U_{BE}$, so that a connecting and disconnecting potential difference appears at the temperature $\Delta t$.

Figure 4:
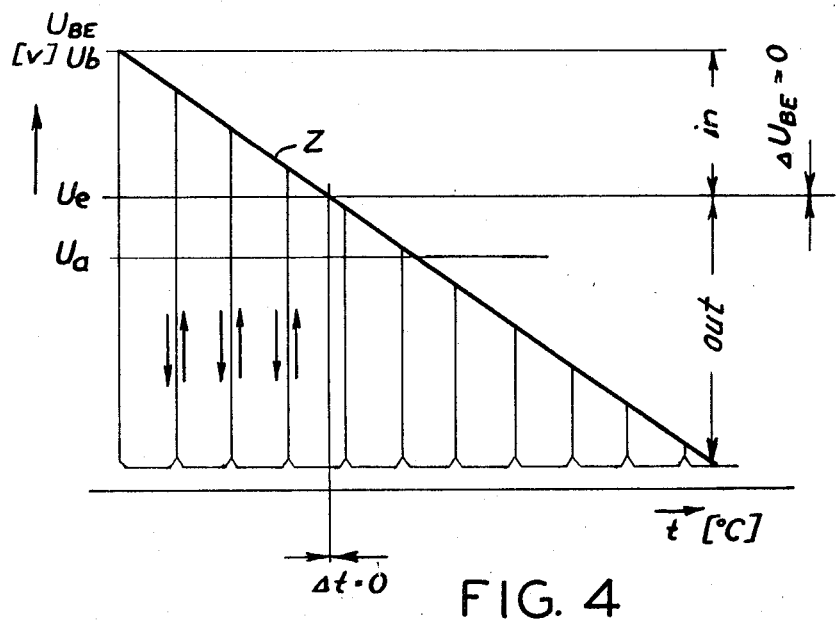
FIG. 4 is diagram graphically illustrating the operation of a regulating arrangement embodying the invention in such a manner that the difference between the cut-in and cutout points is zero.

FIG. 4 graphically illustrates how the unavoidable hysteresis of the switching amplifier can be eliminated so that $U_{BE}=\Delta t=0$ can be attained. Due to the fact that the voltage $U_{BE}$ in FIG. 2 can be raised to the regulating line $z$ with control transistor $T_2$ conducting, and then substantially instantaneously lowered to the value 0, there is such a rapid passage through the hysteresis range of the switching amplifier that $U_e$ and $U_a$ coincide in practice.

The invention arrangement has the effect that the on point and off point for the regulator coincide without the use of complicated feedback and compensating parts. Thus, the point of connection of the regulator is identical with the disconnecting point of the regulator. This, in turn, has a result that only the connecting point is used for regulation, since the threshold value more or less returns to a starting position due to the rhythmic influence of the measuring element.

What is claimed is:

1. A regulator for responding to a varying value, comprising bridge means having four arms and a diagonal, amplifier means having an input circuit forming the diagonal of said bridge means, output means connected to said amplifier means to respond thereto, input means for exhibiting a variable electrical value corresponding to the value to which the regulator responds and in one of the arms, and circuit means forming a second of said arms for repetitively varying the balance of said bridge means at a rate greater than the variation of the value of said input means.

2. A regulator as in claim 1, wherein said circuit means varies the impedance of the second arm.

3. A regulator as in claim 1, wherein said circuit means includes pulse-generating means having a repetition rate greater than the rate at which the value of said input means varies.

4. A regulator as claim 2, wherein said circuit means includes pulse-generating means having a repetition rate greater than the rate at which the value of said input means varies.

5. A regulator as in claim 1, wherein said input means includes a temperature-sensitive element.

6. A regulator as in claim 4, wherein said input means includes a temperature-sensitive element.

7. A regulator as in claim 1, wherein said circuit means includes an impedance and repetitive switch means for varying the impedance from one value to another.

8. A regulator as in claim 7, wherein said impedance includes two resistors, and said switch means repetitively switches one of said resistors into and out of parallel arrangement with the other.

9. A regulator as in claim 7, wherein said impedance includes a resistor and network means for repetitively shunting said resistor.

10. A regulator as in claim 3, wherein said circuit means includes an impedance and repetitive switch means for varying the impedance from one value to another.

11. A regulator as in claim 3, wherein said impedance includes a resistor and network means for repetitively shunting said resistor.

12. A regulator as in claim 5, wherein said circuit means includes an impedance and repetitive switch means for varying the impedance from one value to another.

13. A regulator as in claim 5, wherein said impedance includes a resistor and network means for repetitively shunting said resistor.

14. A regulator as in claim 1, wherein said output means includes electrical integrating means.

15. A regulator as in claim 5, wherein said output means includes electrical integrating means.

16. A regulator as in claim 9, wherein said output means includes integrating means for integrating intermittent voltages.

17. A regulator as in claim 16, wherein said integrating means includes a relay.

18. A regulator as in claim 5, wherein said output means includes a relay and means for maintaining a voltage across said relay in response to repetitive voltage applied across said relay.

19. A regulator as in claim 5, wherein said output means includes a pulse-operated electric element, responsive to voltages applied thereto and integrating means for maintaining the voltage applied across said pulse-operated electric element.

20. A regulator as in claim 1, wherein said circuit means includes a semiconductor device having a main path of current flow connected in the second arm and a pulse generator connected to said semiconductor device.

21. A regulator as in claim 1, wherein said output means includes a threshold value switch.

* * * * *